Feb. 5, 1963 G. WILCOX 3,076,282
FISHING LURE
Filed Jan. 16, 1961
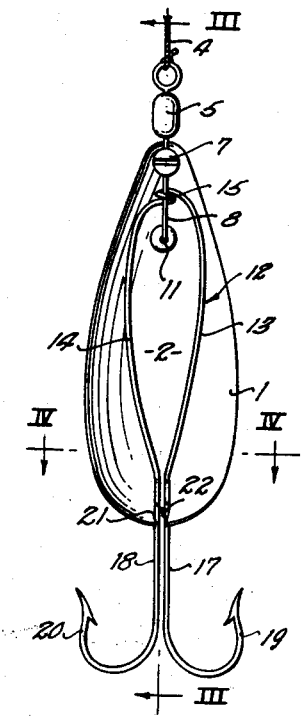
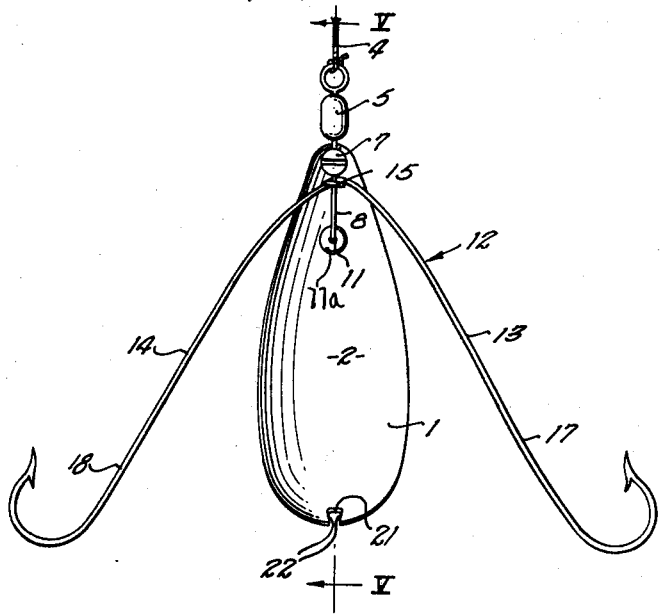
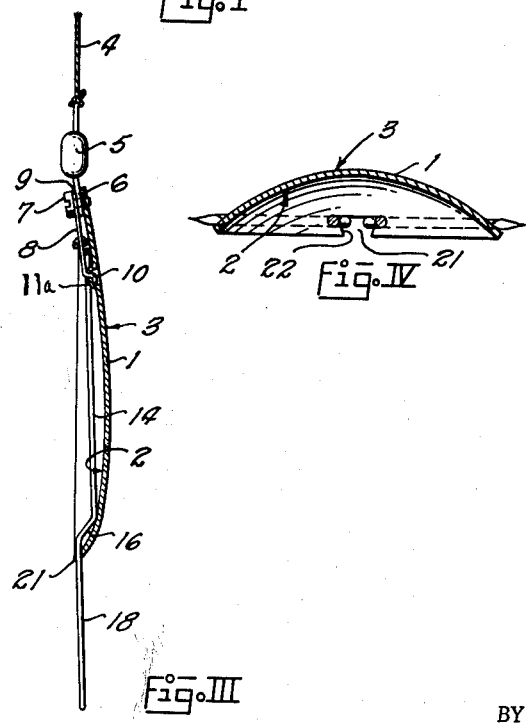
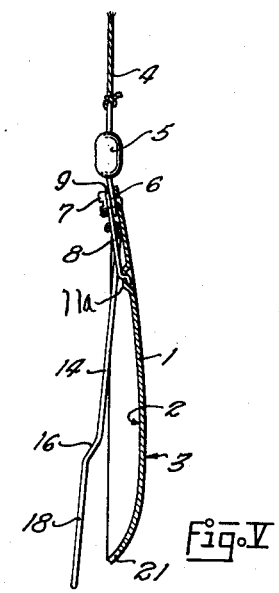
INVENTOR
George Wilcox
BY Howard E. Moore
ATTORNEY United States Patent Office 3,076,282
Patented Feb. 5, 1963

3,076,282
FISHING LURE
George Wilcox, McKinney, Tex. (10503 N. Blvd., Tampa 12, Fla.)
Filed Jan. 16, 1961, Ser. No. 82,827
2 Claims. (Cl. 43—35)

This invention is concerned with a fishing lure, and is particularly concerned with a fishing lure including a trigger mechanism associated with hooks in such a way that the hooks are released to spring outwardly by force exerted thereagainst by a striking fish, so as to embed the hooks in the jaw or other portion of the fish.

The primary object of the invention is to provide a fishing lure wherein the hooks are supported by a spring trigger mechanism which is triggered by the biting fish to cause the hooks to spring outwardly to become embedded in the fish.

A further object of the invention is to provide a trigger mechanism associated with the hooks on a fishing lure which is released by the tug of the fish to cause the hooks thereon to rapidly move outwardly to hook the fish.

A still further object of the invention is to provide a fishing lure including a body having spring supported hooks thereon, which is set by engaging the springs with the recess in the body and is retained therein until the fish strikes the hook which disengages the spring supported hooks from the recess, causing them to spring outwardly from the body to hook the fish.

Another object of the invention is to provide a positive trigger apparatus in conjunction with the fishing lure to cause the hooks to move rapidly toward the fish in close proximity thereto, and hook him.

Other and further objects of the invention will become apparent upon reading the detailed specification hereinafter following, and by referring to the drawing annexed hereto.

A suitable embodiment of the invention is shown in the attached drawing wherein:

FIGURE I is a side elevational view taken from the concave side of the fish lure, showing the hooks in retracted and set position;

FIGURE II is a side elevational view similar to FIG. I showing the hooks in expanded or sprung position;

FIGURE III is a cross-sectional, edge view taken on the line III—III of FIG. I;

FIGURE IV is a transverse, cross-sectional view taken on the line IV—IV of FIG. I; and FIGURE V is an edge cross-sectional view taken on the line V—V of FIG. II.

Numeral references are employed to indicate the various parts shown in the drawings, and like numerals indicate like parts throughout the various figures of the drawings.

The numeral 1 indicates a body, which is spoon-shaped, and has a concaved side 2 and a convex side 3. The body 1 is preferably made of chrome plated material or other bright surfaced material so as to attract the attention of fish when pulled through the water. The cavity 2 causes the spoon to move erratically in the water and to plane the surface of the water, as in conventional spoon-type fishing lures.

The body 1 is attached to a fishing line 4 by means of a conventional swivel 5. The swivel 5 has an eye 6 thereon which is secured to the upper end of the body by means of a screw 7 passed therethrough, and threaded into a suitable threaded hole provided in the body 1.

An elongated guide and support 8, has an eye 9 thereon through which the screw 7 passes to attach the upper end of the guide 8 to the body 1.

The lower end of the guide and support member 8 is provided with an offset end portion 10, which may be passed through a hole 11 provided through the body 1, which preferably is arranged through a raised portion 11a so that the offset portion will be recessed with reference to the outer surface 3 of the body 1.

The hook supporting member 12 is preferably made of spring steel wire-like material, including arms 13 and 14, and has a loop 15 formed substantially at the midpoint of the length thereof. The guide and support member 8 may be passed through the loop 15, the offset end 10 inserted through the hole 11, and the screw 7 placed through the eye 9 thereof, in assembling the guide member 8 with reference to the body 1, and the hook support member 12.

The hook support member 12 also includes offset, outwardly curved portions 16, and terminates with shank portions 17 and 18, and hooks 19 and 20 at the outer extremities thereof.

A rabbet 21 is formed in the lower end of the body 1, which slot has inwardly tapered edges 22 therein for the purpose hereinafter mentioned.

The trigger mechanism is set by moving the spring arms 13 and 14 inwardly until the shanks 17 and 18 are substantially together, placing the shanks 17 and 18 in the rabbet 21, and releasing same, allowing the shanks 17 and 18 to spring outwardly against the tapered surfaces 22 which holds the shanks 17 and 18 in the rabbet 21. It will be noted in FIG. III that the arms 13 and 14 are recessed in the concave area 2 by reason of the offset portions 16, so that none of the trigger mechanism extends outwardly of the concave side 2 to permit same to come into contact with a brush or other obstructions in the water.

It will be seen that when a fish strikes either of the hooks 19 or 20, they will be caused to spring inwardly to release same from the rabbet 21. The release of one of the shanks 17 or 18 from the rabbet 21, causes the hook to move rapidly outwardly, and will also disengage the other shank from the rabbet 21 and allow the other hook to move outwardly. However, in any event, rapid movement of the hook outwardly by spring action drives the hook into the jaw or other portion of the fish and positively engages and hooks the fish. In many instances it has been found that hooks 19 and 20 are embedded in opposite jaws of the fish.

It will thus be seen that I have provided a fishing lure which is not only attractive to the fish, but which, when the fish strikes the hook, disengages same to cause it to move outwardly by spring action to embed the hook in the fish, thereby providing a positive means for engaging the fish.

Having described my invention, I claim:

1. An improvement in a fishing lure, having an elongated body member with concave and convex surfaces thereon, having a retaining rabbet with inwardly tapered sides located in the extreme rear end thereof for holding hooks in a retracted position, a hook support member with an eye formed on the front end to receive an assembly screw and an offset portion formed on the rear end, a boss formed on the concave surface of the body member with a hole through the boss to accommodate the offset portion of the support member, thereby providing a space between the support member and the body member, a single hook member with spring steel arms, having fish-hooks formed on the ends thereof, having an attaching loop formed midway between the arms to permit a flexible and slidable mounting thereof upon the support member, said hooks being under spring tension when engaged in said rabbet, the arms of said hook member having an offset portion which causes the arms to be disengaged from the retaining rabbet when the hook member is slid rearwardly against the curved portion of the body member when a fish makes contact with either hook, thereby releasing the spring action of the hook member which causes the two hooks to spring outwardly within the mouth of a striking fish thereby making escape improbable.

2. In a fishing lure, a spoonlike body member, having a concave and a convex surface thereon, having a boss within the concave surface, and having a retaining rabbet in the extreme rear end of the body member, a one piece hook member made of spring steel and having a pair of arms and a hook at the outer end of each arm and an attaching loop located midway between the hooks at right angles to the plane of the hooks, an offset in each of said arms of the hook member, a hook support member for pivotally and slidably mounting the attaching loop of the hook member and means for fastening the support member to said boss and a swivel connected to the body member, wherein tension is obtained in the arms of the hook member by squeezing the hooks together with the thumb and finger and placing said arms in the retaining rabbet, with the offset arms being in contact with the concave portion of the body member, whereby, when a fish makes contact with either hook, the hook member slides rearwardly within the concave of the body member, the offset in the arms engaging the concave surface forces the hook member out of the retaining rabbet freeing the spring arms to expand outwardly within the mouth of a fish.

References Cited in the file of this patent

UNITED STATES PATENTS

| | | |
|---|---|---|
| 446,827 | Cass | Feb. 17, 1891 |
| 470,312 | Stretch | Mar. 8, 1892 |
| 594,906 | Schindler | Dec. 7, 1897 |
| 985,659 | Clayton | Feb. 28, 1911 |
| 1,197,820 | Guise | Sept. 12, 1916 |
| 1,462,949 | Walls | July 24, 1923 |
| 1,994,168 | Boyko | Mar. 12, 1935 |
| 2,163,378 | Horvath | June 20, 1939 |
| 2,230,904 | Parkins | Feb. 4, 1941 |
| 2,242,592 | Noxon | May 20, 1941 |
| 2,479,484 | Fornas | Aug. 16, 1949 |